J. W. HEAGNEY.
SPRING WHEEL.
APPLICATION FILED NOV. 25, 1911.

1,040,945.

Patented Oct. 8, 1912.
2 SHEETS—SHEET 1.

Inventor
John W. Heagney

Witnesses
Geo. Ackman Jr.
V. B. Hillyard.

By Victor J. Evans
Attorney

J. W. HEAGNEY.
SPRING WHEEL.
APPLICATION FILED NOV. 25, 1911.
1,040,945.
Patented Oct. 8, 1912.
2 SHEETS—SHEET 2.
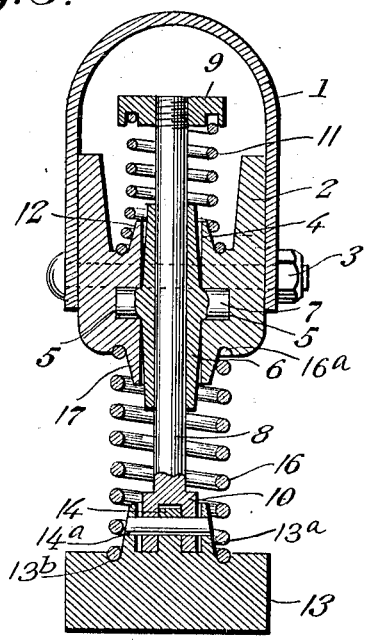
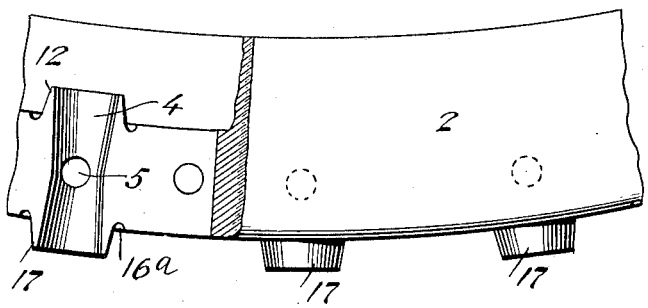
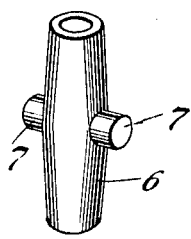
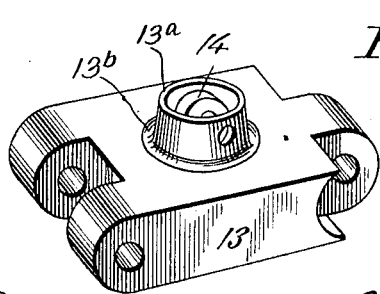
Witnesses
Geo. Ackman.
U. B. Hillyard.
Inventor
John W. Heagney
By Victor J. Evans
Attorney

UNITED STATES PATENT OFFICE.

JOHN W. HEAGNEY, OF MELROSE, IOWA.

SPRING-WHEEL.

1,040,945.  Specification of Letters Patent.  Patented Oct. 8, 1912.

Application filed November 25, 1911. Serial No. 662,381.

*To all whom it may concern:*

Be it known that I, JOHN W. HEAGNEY, a citizen of the United States, residing at Melrose, in the county of Monroe and State of Iowa, have invented new and useful Improvements in Spring-Wheels, of which the following is a specification.

The invention is primarily designed to supply a vehicle wheel with a yieldable tread to render riding easy and comfortable and to overcome jar to machinery when the vehicle is of the automobile type, the principal object being the provision of a tread possessing substantially all the advantages of a pneumatic tire but free from the objections incidental to puncture and other causes which result in deflation of the tire and the excessive cost in the maintenance thereof.

The invention contemplates a sectional tread composed of members which are pivotally connected, said tread being essentially of metal so as to resist wear and also by reason of its peculiar formation to prevent skidding or slipping, the latter being of value when the tire is applied to the drive wheel of a mechanically propelled vehicle.

The invention further contemplates peculiar connections between the tread and the rim, said connections embodying guide means, springs and elements mounted to have a limited oscillatory movement in the plane of the wheel but prevented from any lateral or sidewise play.

The invention consists of the novel features, details of construction and combination of parts, which hereinafter will be more particularly set forth, illustrated in the accompanying drawings, and pointed out in the appended claims.

Figure 1:
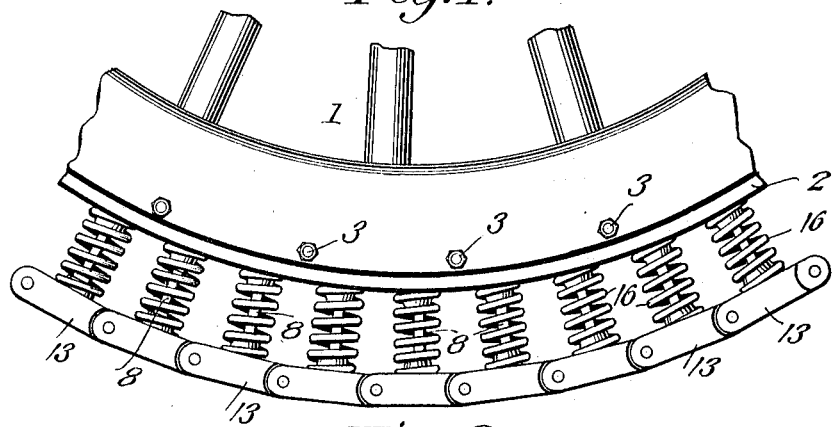
Figure 2:
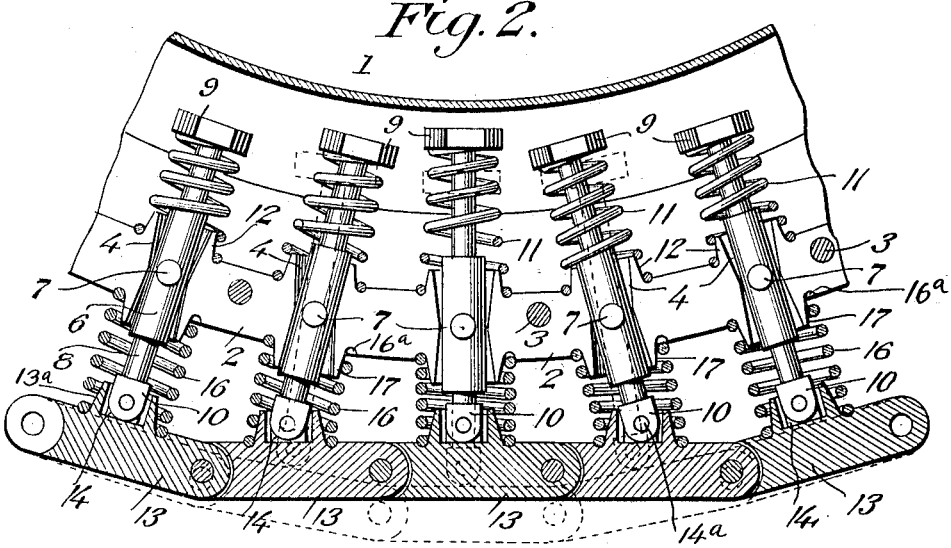
Figure 4:
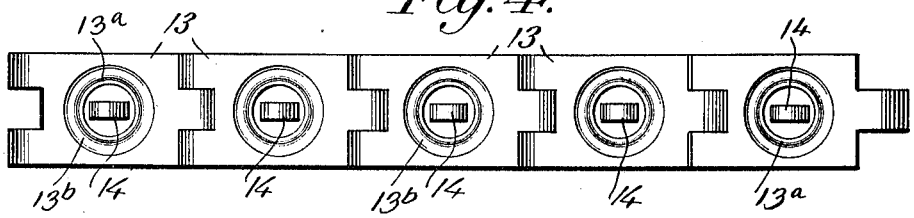

Referring to the drawings, forming a part of the specification, Figure 1 is a side view of a portion of the rim of a vehicle wheel embodying the invention. Fig. 2 is a sectional view of the rim in the plane of the wheel, showing by full and dotted lines the extreme movements of the oscillatory guiding elements. Fig. 3 is a transverse section on the line *x—x* of Fig. 1. Fig. 4 is a detail view of a portion of the tread. Fig. 5 is a detail view of a part of the rim having a portion in section to show the openings provided to receive the trunnions of the oscillatory guide elements. Fig. 6 is a detail view of one of the oscillatory guide elements. Fig. 7 is a detail view in perspective of one of the members of the tread.

Corresponding and like parts are referred to in the following description, and indicated in all the views of the drawings, by the same reference characters.

The invention embodies a channel rim 1 and a sectional rim 2. The channel rim 1 may be rolled or formed in any manner but the sectional rim 2 is preferably cast, the parts being separable on a medial line and when assembled secured by means of bolts or fastenings 3. The edge portions of the channel rim 1 embrace the sides of the rim 2 and are secured by means of the bolts or fastenings 3. The channel rim 1 may constitute the felly of the wheel to which the tire is fitted and may have the outer ends of the spokes secured thereto in any manner. The rim 2 has radial openings 4 which are slightly enlarged toward their ends in the plane of the wheel. Transverse openings 5 intersect the radial openings 4 and form bearings to receive the trunnions of the oscillatory guide elements.

Sleeves 6 are mounted in the radial openings 4 and are adapted to have limited oscillatory movement in the plane of the wheel but are prevented from any lateral or side movement. The sleeves 6 preferably taper from a middle point toward their extremities and are formed intermediate of their ends with lateral trunnions 7 which are adapted to obtain a bearing in the openings 5. The opening of each of the sleeves or oscillatory guide elements 6 is uniform throughout its length to enable the guide rods 8 arranged to operate therein to move freely without any lateral play or binding action. The ends of the sleeves 6 project beyond the outer and inner walls of the rim 2 a distance to insure proper support and guidance for the rods 8. The sleeves 6 may be cast or formed in any manner.

The guide rods 8 fit snugly within the sleeves 6 and their inner ends are threaded and receive nuts 9 and their outer ends are enlarged to form heads 10 which are slotted in their outer ends and have their extremities made rounding to provide for a rocking movement of the tread members. The guide rods 8 are adapted to reciprocate within the sleeves 6 and also oscillate with said sleeves in the plane of the wheel. The nuts 9 are recessed in the sides facing the rim 2, said recesses constituting seats to receive the inner ends of the helical springs 11, the outer ends of said springs bearing against the inner side of the rim 2 and entering grooves formed therein at the base of projections 12. The springs 11 exert an inward pressure upon the guide rods 8.

The tread is flexible and comprises a plurality of members 13 which are pivotally connected in substantially the same manner as links of a chain. The tread members 13 consist of cast metal blocks, each block or member having a tongue at one end and a corresponding recess at the opposite end so that when the members are assembled the tongue of one enters the recess of the other, the parts being transversely apertured to receive pivot or coupling pins. The end of one member is made rounding, whereas the end of the adjacent member is correspondingly depressed or made concave, thereby admitting of the abutting ends of the members fitting closely. Each member 13 has a centrally disposed lug 14 upon its inner side which is adapted to enter the slot formed in the head 10 of a guide rod, the parts being formed with registering transverse openings to receive a pivot pin 14$^a$. A projection 13$^a$ is formed upon the inner side of each member 13 and a groove 13$^b$ provided in the member surrounding the projection forms a seat in which the outer end of a helical spring 16 is fitted. The helical springs 16 surround the guide rods 8 and the outer ends of the sleeves 6 and their inner ends are seated in grooves 16$^a$ formed in the outer side of the rim 2 at the base of projections 17. The projections 13$^a$ and 16$^a$ are of annular form and taper slightly upon their outer sides so as to center the ends of the springs 16 which are fitted thereover. The annular projections 13$^a$ have openings in line with the openings of the lugs 14 to receive the ends of the pivot pins 14$^a$. The springs 16 are sufficiently stout to press the tread portion of the tire outwardly so as to sustain the weight of the load.

The inner side of the rim 2 is grooved or channeled so as to afford protection for the inner ends of the sleeves 6 and the projections 12.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the embodiment thereof, I desire to have it understood that the device shown is merely illustrative, and that such changes may be made when desired as are within the scope of the claims appended hereto.

Having thus described the invention what is claimed as new, is:—

1. A spring tire comprising a rim, a flexible tread comprising pivotally connected members, the latter having lugs and annular projections upon their inner sides, guide rods mounted upon the rim and having their outer ends made rounding to engage the inner sides of the tread members and formed with slots to receive the lugs thereof, pins pivotally connecting the outer ends of the guide rods to the lugs and annular projections, and springs interposed between the tread members and rim and having their outer ends fitted upon the annular projections of the said tread members.

2. A spring tire comprising a rim having radial openings and having outer annular projections in line with the openings and further provided with grooves at the base of the annular projections, sleeves mounted in the radial openings of the rim and having a limited oscillatory movement, a tread comprising pivotally connected members, the latter having lugs and annular projections upon their inner sides and having grooves at the base of the annular projections, guide rods mounted in the sleeves and pivotally connected at their upper ends to the lugs of the tread members, and helical springs surrounding the guide rods and having their ends receiving the annular projections of the rim and tread members and fitted in the grooves of the respective parts.

In testimony whereof I affix my signature in presence of two witnesses.

JOHN W. HEAGNEY.

Witnesses:
DENNIS J. DINNEEN,
MICHAEL J. COLEMAN.

Copies of this patent may be obtained for five cents each, by addressing the "Commissioner of Patents Washington, D. C."